United States Patent [19]
Yasumoto et al.

[11] 4,316,215
[45] Feb. 16, 1982

[54] SYSTEM FOR IMPROVING REPRODUCTION OF IMAGES IN A COLOR TELEVISION RECEIVER

[75] Inventors: Yoshio Yasumoto; Tetsuo Tomimoto, both of Osaka; Eiichi Taira, Hirakata, all of Japan

[73] Assignee: Matsushita Electric Industrial Co., Ltd., Osaka, Japan

[21] Appl. No.: 188,478

[22] Filed: Sep. 18, 1980

[30] Foreign Application Priority Data

Sep. 26, 1979 [JP] Japan .................................. 54-124623
Dec. 6, 1979 [JP] Japan .................................. 54-158542

[51] Int. Cl.$^3$ ........................ H04N 9/535; H04N 5/14
[52] U.S. Cl. ...................................... 358/37; 358/162; 358/166
[58] Field of Search ................... 358/37, 166, 96, 162, 358/160

[56] References Cited

U.S. PATENT DOCUMENTS

Re. 29,570 3/1978 Breimer et al. ....................... 358/37
3,789,133 1/1974 Kline .................................... 358/37

*Primary Examiner*—Robert L. Richardson
*Attorney, Agent, or Firm*—Burgess, Ryan and Wayne

[57] ABSTRACT

A system for improving color picture qualities in which in response to the output signal representative of whether the transient portion of the luminance signal Y and the color difference signal (C−Y), where C is R, G or B, is in the same direction or in the opposite directions, the high-frequency component in the luminance signal is so controlled as to provide the correction signal which serves to improve the contour lines of the images in the reproduced color picture.

8 Claims, 16 Drawing Figures

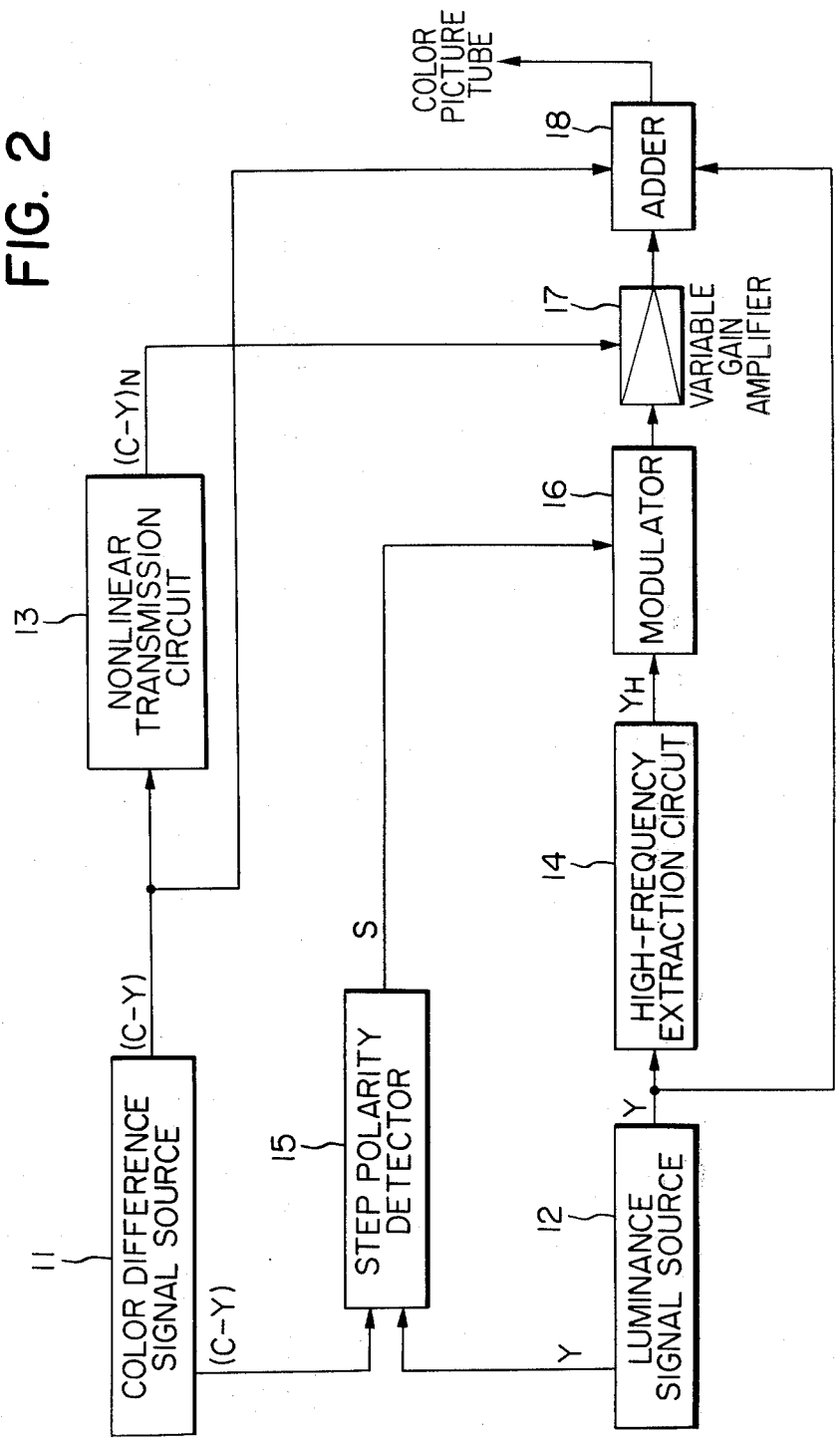

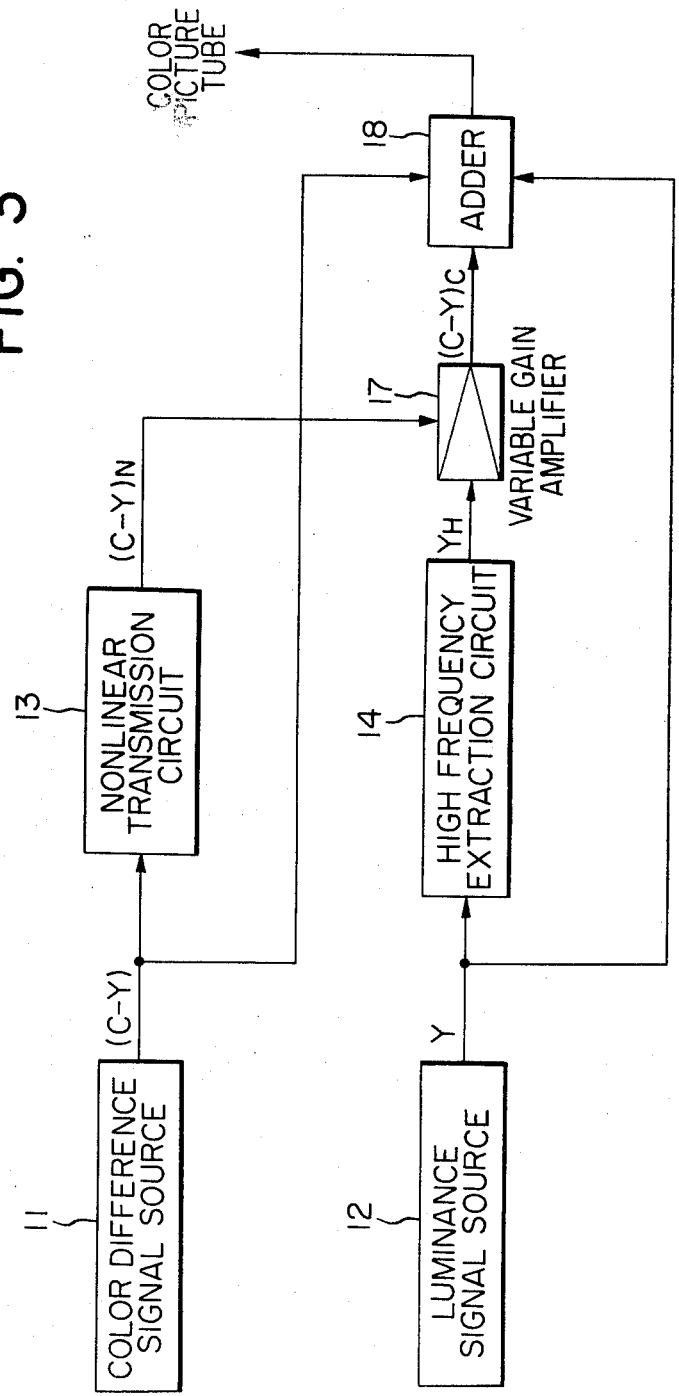

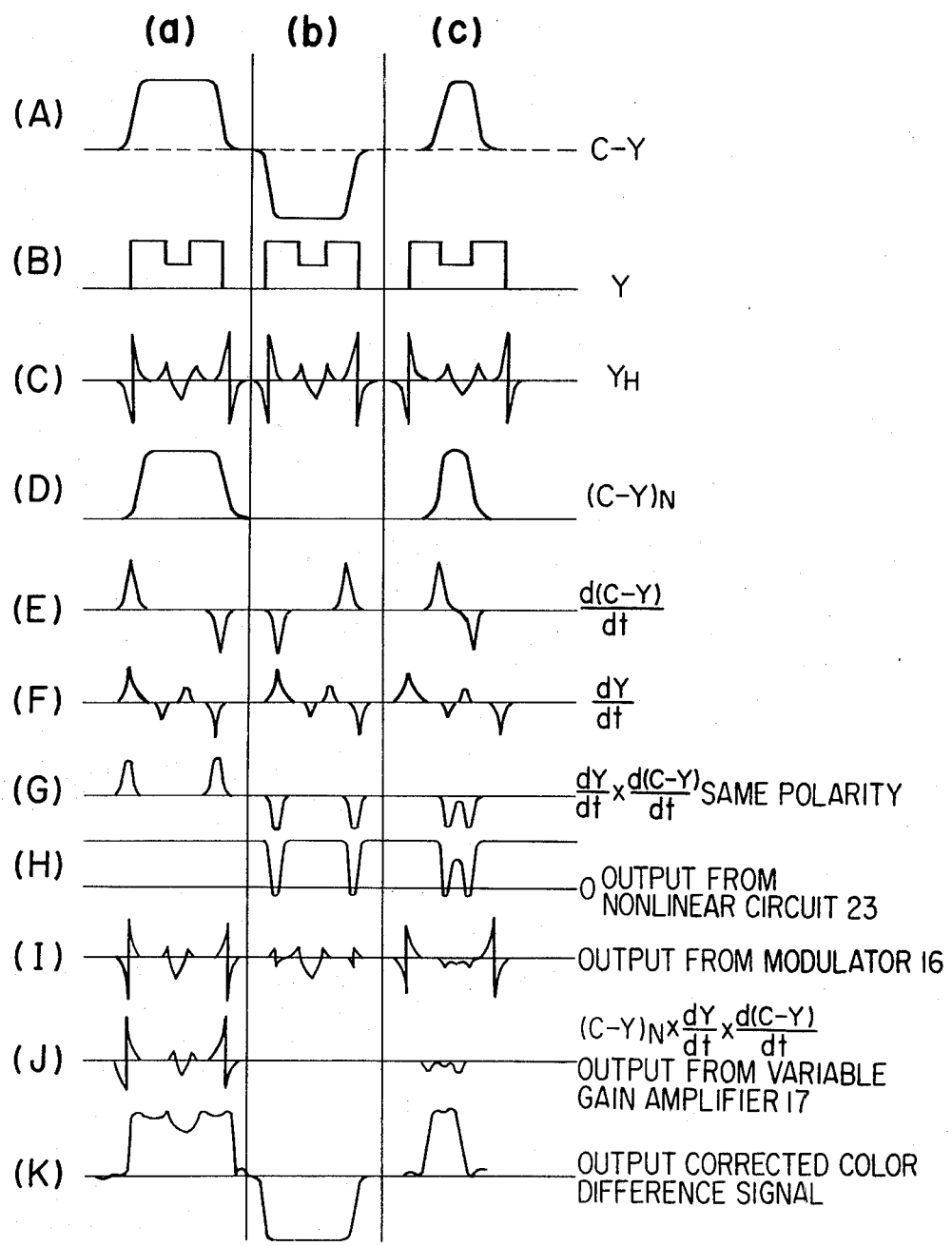

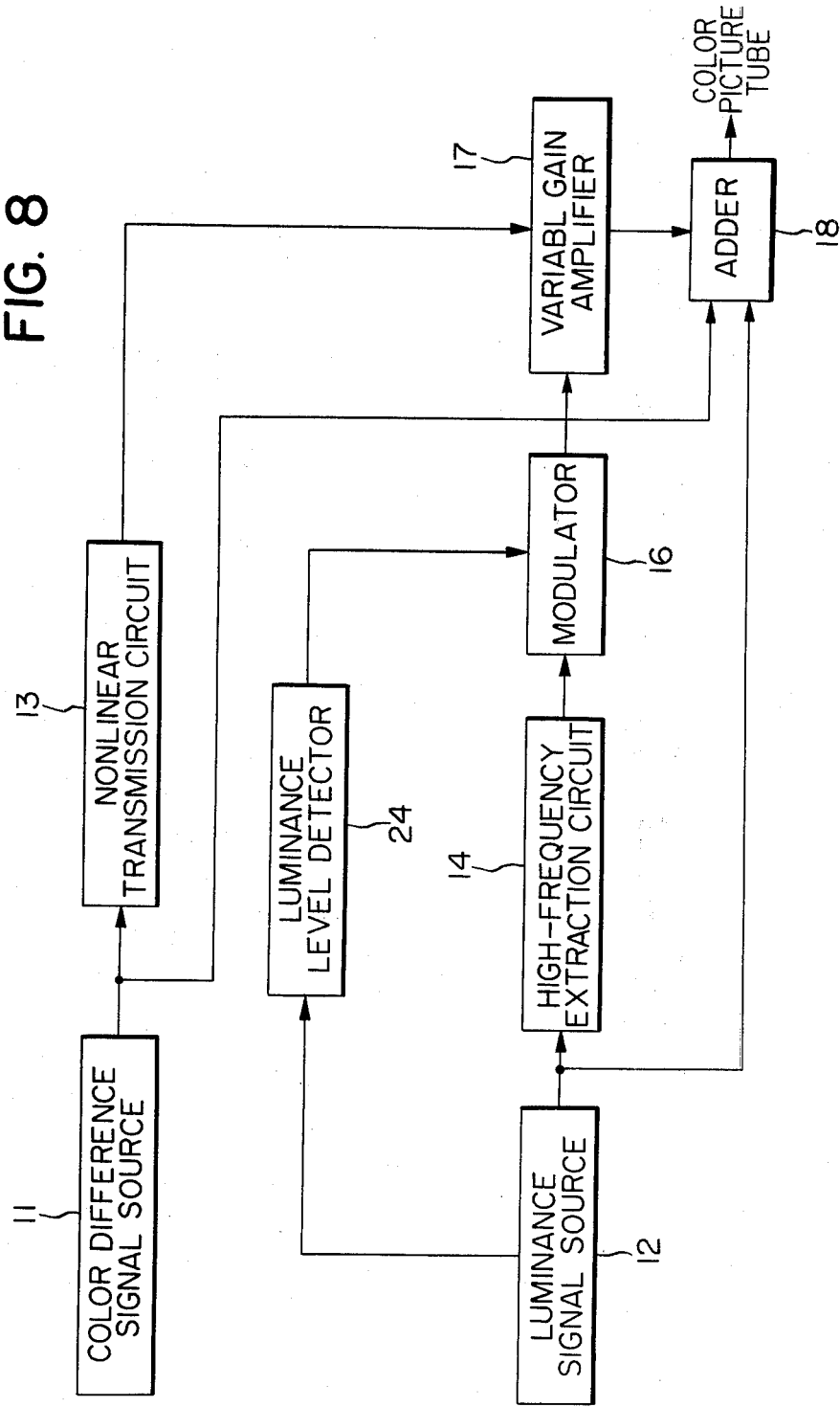

SYSTEM FOR IMPROVING REPRODUCTION OF IMAGES IN A COLOR TELEVISION RECEIVER

BACKGROUND OF THE INVENTION

The present invention relates to generally a color television receiver and more particularly a system for improving picture qualities of objects in color in the reproduced picture so that the objects in color can be seen with high definition or they can be sharply outlined.

In the conventional color television system, the color difference signal (from, for example, a color demodulator) has a frequency band considerably narrower than the luminance signal from a luminance signal amplifier. For instance, in the case of the NTSC color television receivers, the luminance signal has the frequency components ranging from 0 to 3 MHz, but the color difference signal has relatively low frequency components extending only up to 500 KHz. Since the color difference signals with the narrow frequency bands mainly compose the objects in color, these objects are vaguely contoured with poor definition.

SUMMARY OF THE INVENTION

The present invention, therefore, has for its object to provide a system capable of substantially overcoming the problem described above and featured in that depending upon the magnitudes of the color difference signals, high frequency components of the luminance signal are forced to mix into the color difference signals, whereby the definition of the objects in color can be improved.

According to one embodiment of the present invention, the transient portions of the color difference signals can be unmistakably corrected by the detection of the polarities of the rise and fall in the amplitude transient portions of the luminance signal and the color difference signals.

According to another embodiment of the present invention, said operation is limited by the portion of the luminance signal having a high rate of change, so that erratic operations due to the incoincidence in polarity between the rates of change between the luminance signal and the color difference signals can be minimized.

BRIEF DESCRIPTION OF THE DRAWINGS

FIG. 2 is a block diagram of a first embodiment of a system for improving picture qualities in accordance with the present invention;

FIG. 3 is a view similar to FIG. 2 except that a step polarity detector and a modulator are eliminated;

FIG. 7, including 7A-7K, shows various waveforms used for the explanation of the mode of operation of the first embodiment;

FIG. 8 is a block diagram of a second embodiment of the present invention;

Same reference numerals are used to denote similar parts throughout the figures.

DESCRIPTION OF THE PREFERRED EMBODIMENTS

Figure 1:
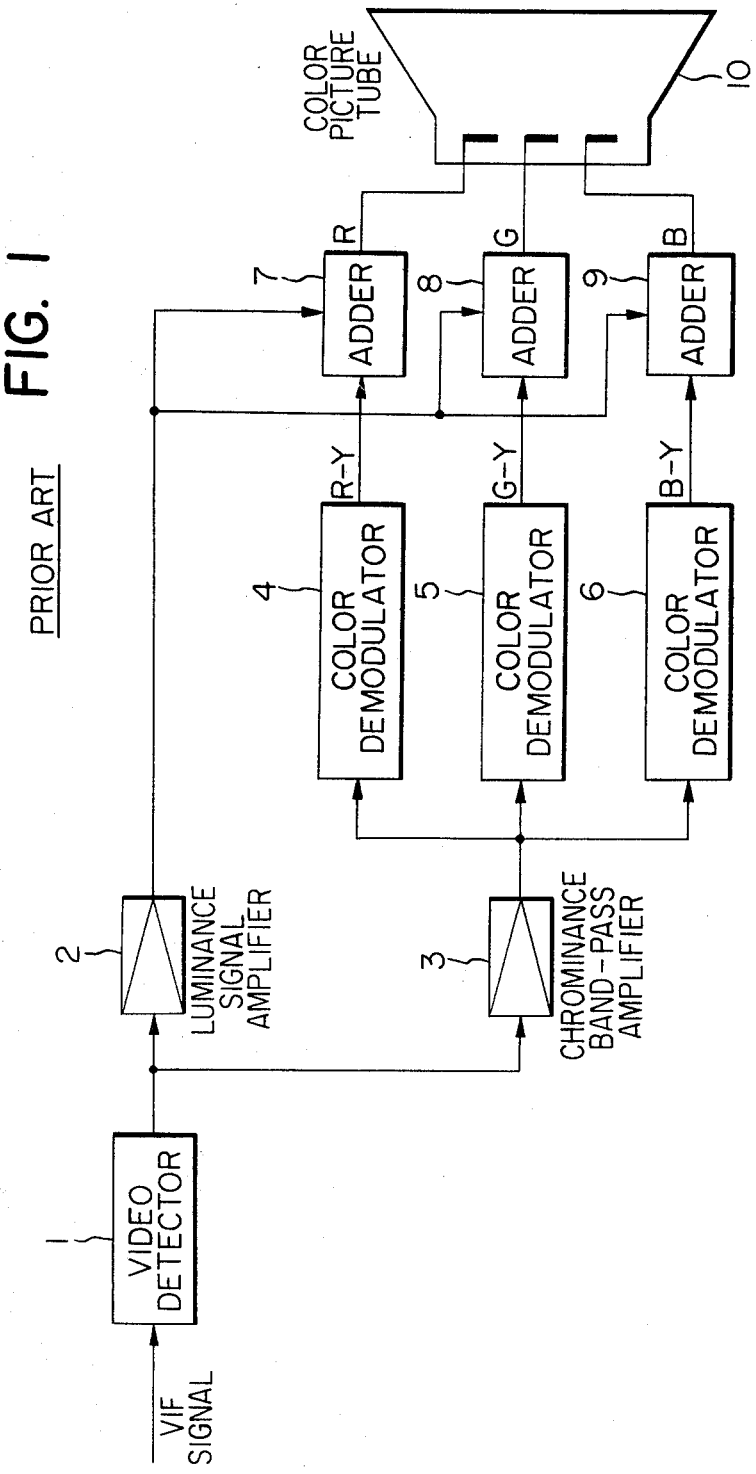
FIG. 1 is a block diagram of a prior art color television receiver.

FIG. 1 is a block diagram of a prior art color television receiver. VIF (video intermediate frequency) signal from the television tuner is detected by a video detector 1, the output of which is applied in parallel to a luminance signal amplifier 2 and a chrominance bandpass amplifier 3 which in turn passes and amplifies only the color carrier signal included in the composite color video signal, the output being applied to three color difference signal demodulators 4, 5 and 6.

Color difference signal demodulators 4, 5 and 6 provide three color difference signals $(R-Y)$, $(G-Y)$ and $(B-Y)$, respectively, which in turn are applied to adders 7, 8 and 9, respectively. The adders 7, 8 and 9 also receive the luminance or Y signal from the luminance signal amplifier 2 and add it to the color difference signals received, whereby three primary color signals are provided and transmitted to a color picture tube 10.

In the color television receiver of the type described above, the color difference signal (for example, the output from the color demodulator 4) is considerably smaller in bandwidth than the luminance or Y signal from the luminance signal amplifier 2. For instance, in the case of NTSC color television receivers, the luminance signal contains the frequency components of from 0 to 3 MHz, but the color difference signals, the frequency components of up to 500 KHz at the highest. Since the color difference signals with the narrow frequency bands mainly compose the images in the colored part in the scene, the picture is reproduced with poor definition.

First Embodiment, FIGS. 2 through 7

Referring first to FIG. 2, a color difference signal source 11 is capable of generating the color difference signal $(C-Y)$, where C represents R, G or B), and, therefore, corresponds to the color difference signal demodulator 4, 5 or 6 as shown in FIG. 1. A luminance or Y signal source 12 is capable of generating the luminance or Y signal and, therefore, corresponds to the luminance signal amplifier 2 as shown in FIG. 1.

A nonlinear transmission circuit 13 receives the color difference signal $(C-Y)$ from the color difference signal source 11 and provides the output $(C-Y)_N$ with nonlinear transmission characteristics as the gain control signal. Some limitations are imposed on this nonlinear circuit 13 as will be described in detail below.

A high-frequency extraction circuit 14 extracts the high frequency component $Y_H$ from the luminance signal Y from the source 12. The extraction circuit 14 is not limited only to high-pass filters. A step polarity detector 15 detects the polarities of the transient portions of both the color difference signal $(C-Y)$ and the luminance signal Y or detects whether both the signals $(C-Y)$ and Y are increasing or decreasing simultaneously and provides the output signal S which in turn is applied to a modulator 16. The modulator 16 receives the output or high-frequency component $Y_H$ from the extractor 14 and modulates it with the output signal S.

The modulator 16 may be a multiplier. A variable gain control amplifier 17 controls the amplification gain of the modulated high-frequency component $Y_H$ from the modulator 16 in response to the gain control signal $(C-Y)_N$ from the nonlinear transmission circuit 13. The gain-controlled modulated high-frequency component $Y_H$ is applied as a correction signal to an adder 18 and combined with the color difference signal $(C-Y)$ and the luminance signal Y. The combined signal is applied to a color television tube (not shown). In the sense that the adder 18 combines various video signals, it may be an adder in a very broad sense. Therefore, it is not limited to an electronic circuit and includes, for instance, the combinations of the electron guns with each others in color picture tubes or the combinations of light outputs.

The step polarity detector 15 and the modulator 16 are essential elements in the first embodiment. In FIG. 3 is shown the block diagram similar to FIG. 2 except that the detection circuit 15 and the modulator 16 are eliminated. The operation of the circuitry shown in FIG. 3 is as follows.

The output $(C-Y)_C$ from the amplifier 17 is expressed by $$(C-Y)_C = Y_H \times (C-Y)_N$$

where $Y_H$ = the output or high-frequency component from the extractor 14, and $(C-Y)_N$ = the output from the nonlinear transmission circuit 13.

The correction signal $(C-Y)_C$, therefore, includes the high-frequency component $Y_H$ of the luminance signal Y which is dependent upon the color difference signal. Since the rise and fall at the transition of the color difference signal do not necessarily coincide with those of the high-frequency component, the resulting correction signal $(C-Y)_C$ is very likely to suppress the transient portion of the color difference signal. However, with the step polarity detection circuit 15 and the modulator 16 which modulates the high-frequency component $Y_H$ of the luminance signal Y, this problem can be eliminated and hence these circuit elements 15 and 16 are very important as will be described in detail below.

Figure 4A:
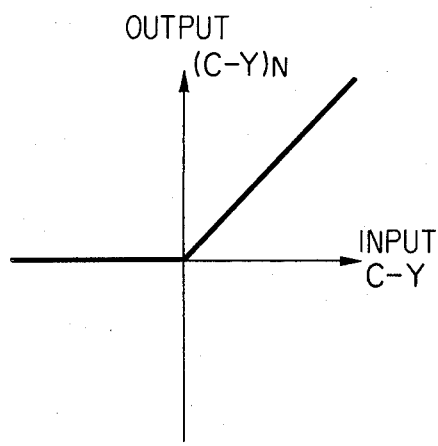
FIG. 4, including 4A-4C, shows some input-output characteristic curves of a nonlinear transmission circuit shown in FIG. 2 and FIG. 3.
Figure 4B:
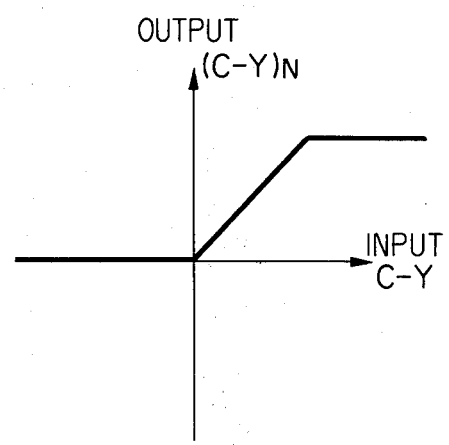
Figure 4C:
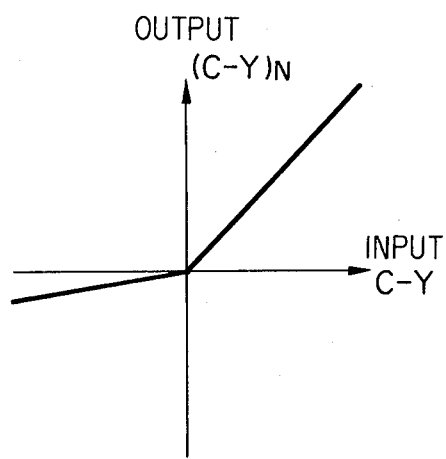

As described above, the nonlinear transmission circuit 13 receives the color difference signal and provides the output with nonlinear transmission characteritics. As shown in FIG. 4, various relationships exist between the input and the output of the circuit 13. For instance, as shown in FIG. 4A, the output may be portional to the positive input but becomes zero when the input is negative. As shown in FIG. 4B, the output may be zero when the input is negative, increase from zero to a predetermined level linearly as the input positively increases to a predetermined level and then become flat. In FIG. 4C, the output is maintained at a low negative level when the input is negative, increases as the input exceeds zero. The nonlinear transmission circuit 13 is capable of all the input-output relationships in which the output is suppressed to zero or maintained at a very low level when the input is negative. These input-output characteristics or relationships are advantageous in that when the amplifier 17 controls the high-frequency component $Y_H$ in response to the control signal $(C-Y)_N$ the chances for reversing the polarity of the high-frequency component $Y_H$ of the luminance signal Y become very few.

Figure 5:
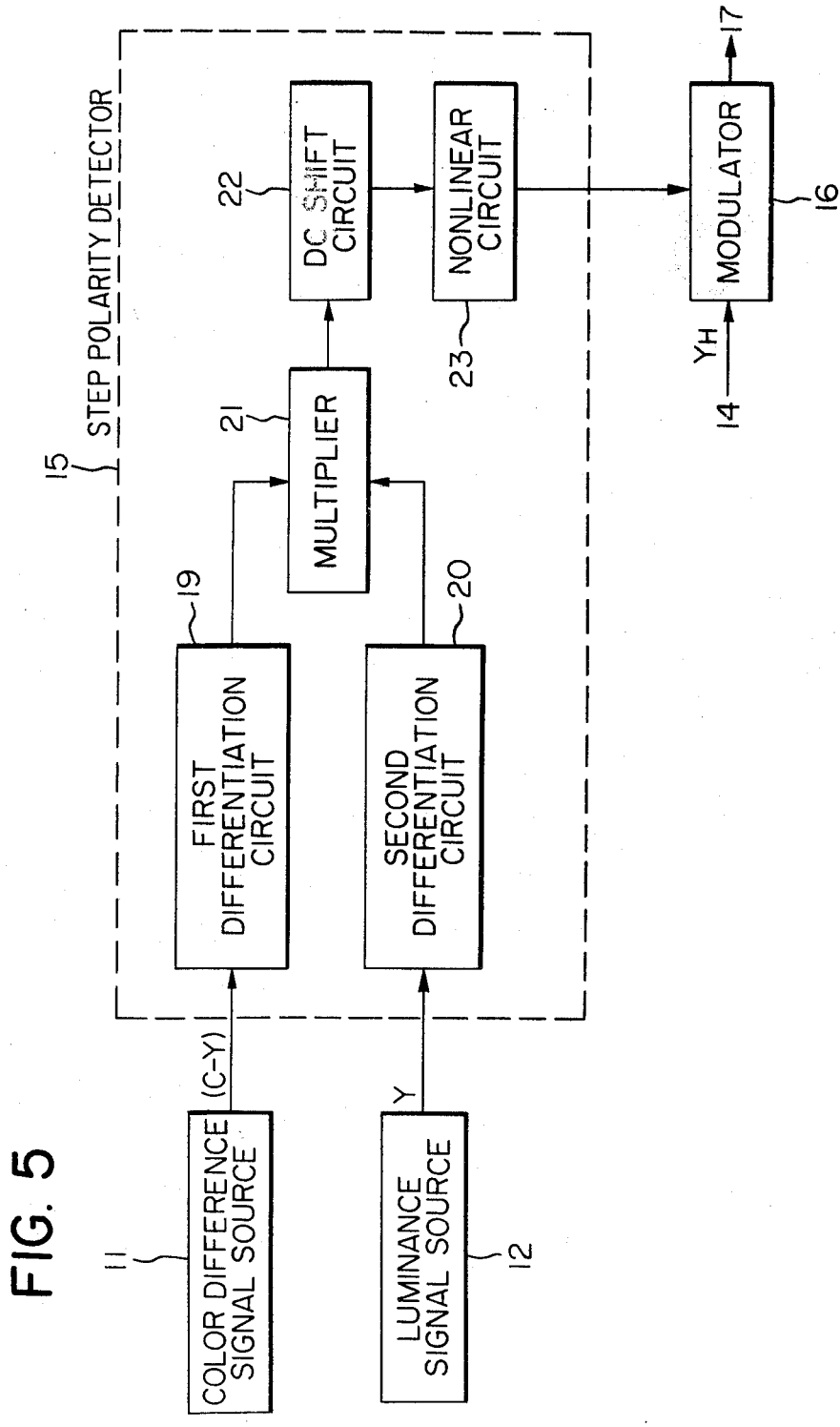
FIG. 5 is a block diagram of the step polarity detector shown in FIG. 2.

Next referring to FIG. 5, the construction of the step polarity detector 15 will be described in detail. A first differentiation circuit 19 receives the color difference signal $(C-Y)$ from the color difference signal source 11 and differentiates it. Differentiation can be accomplished with a differentiation circuit consisting of a resistor and a capacitor or a time-delay element and a differential amplifier. In like manner, a second differentiation circuit 20 receives the luminance signal Y and differentiates it. Both the outputs from these differentiation circuits 19 and 20 are applied to a multiplier 21 to obtain the product which may be expressed by $$(dY/dt) \times (d(C-Y)/dt)$$

The product output is positive when the transitions of the luminance signal Y and the color difference signal $(C-Y)$ rise or fall simultaneously, but is negative if otherwise.

A DC shift circuit 22 receives the product output from the multiplier 21 and changes its DC level. A nonlinear circuit 23 imparts nonlinear characteristics to the output from the DC shift circuit 22.

The mode of operation of the nonlinear circuit 23 in combination with the DC shift circuit 22 will be described with reference to FIGS. 6A through 6E in which the output from the multiplier 21 is plotted along the abscissa while the output from the step polarity detector 15, along the ordinate.

Figure 6A:
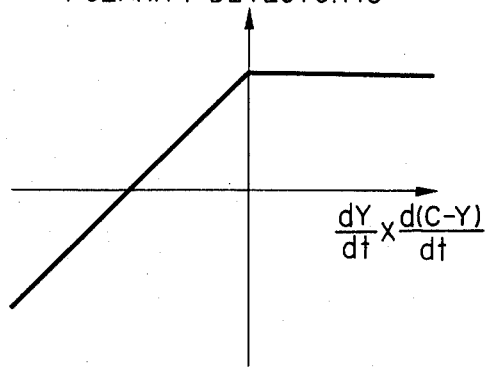
FIG. 6, including 6A-6E, shows some input-output characteritic curves of a nonlinear circuit shown in FIG. 5.

In FIG. 6A, in response to the positive input, the output is maintained at a predetermined positive level, but when the input is negative, the output increases linearly. With this control output, when the transitions of both the luminance signal Y and the color difference signal $(C-Y)$ are in the same direction, the modulator 16 will not modulate the high-frequency component $Y_H$ of the luminance signal Y. In other words, the high-frequency component $Y_H$ passes through the modulator 16 without being modulated to the amplifier 17. On the other hand when the transitions are in opposite directions, the modulator 16 suppresses the high-frequency component $Y_H$ dependent upon the magnitude of transition. When the transition exceeds a predetermined magnitude, the polarity of the output is reversed. This means that the correct polarity correction is added to the transient portions.

Figure 6D:
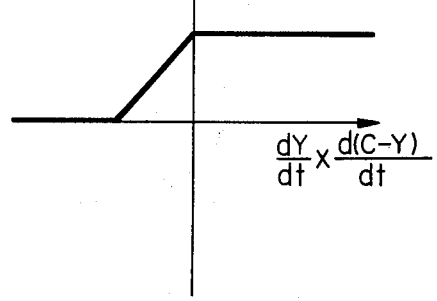
Figure 6B:
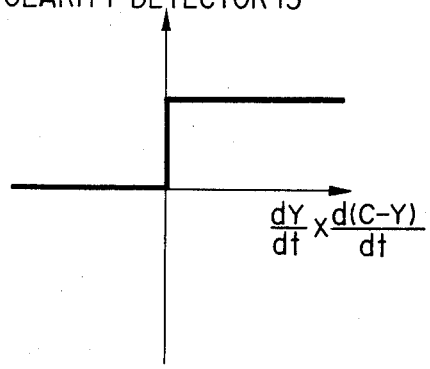

In FIG. 6B, the output is maintained at a constant positive level when the input is positive, but becomes zero when the input is negative. Therefore, the transient portions of the luminance signal Y and the color difference signal $(C-Y)$ are in the opposite directions, the high-frequency component $Y_H$ is completely suppressed and consequently not transmitted to the amplifier 17. In other words, no correction signal is provided.

Figure 6E:
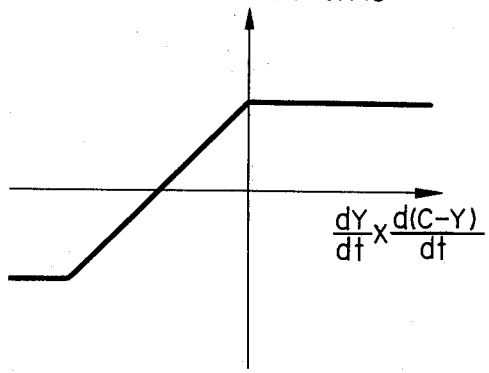
Figure 6C:
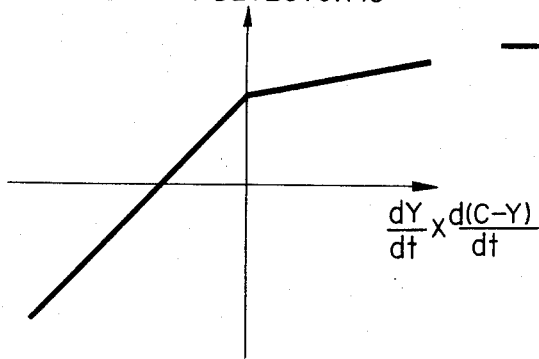

In FIG. 6C, when the input signal is negative, the output increases linear, but when the input becomes positive, the output curve is flattened to some extent; that is, the slope of the output curve becomes gentle. When the transient portions of the luminance signal Y and the color difference signal $(C-Y)$ are in the same direction, the modulator 16 provides the high-frequency component $Y_H$ with an increased magnitude. This means, a large correction signal is provided.

In FIG. 6D, when the input is negative and less than a predetermined level, the output is suppressed to zero, but when the input exceeds this predetermined negative level, the output increases linearly to a predetermined positive level until the input becomes zero. When the input exceeds zero, the output is maintained at this predetermined positive level. When the output is zero, the modulator 16 suppresses the high-frequency component $Y_H$. This means that when the transient portions of the luminance signal Y and the color difference signal (C−Y) are opposite in directions and exceed specified levels, no correction signal will be provided.

In FIG. 6E, when the input is negative and less than a predetermined negative level, the output is maintained at a predetermined negative level, but when the input exceeds this predetermined negative level, the output increases linearly with increase in input to a predetermined positive level until the input reaches zero. When the input becomes positive, the output is maintained at this predetermined positive level. Therefore, it follows that when the transient portions of the Y and (C−Y) signals are in the same direction, the high-frequency component $Y_H$ passes through the modulator 16 without being modulated to the amplifier. On the other hand when the transient portions are in the opposite directions, the modulator 16 reduces the magnitude of the high-frequency component $Y_H$ or reverse its polarity depending upon the degrees of the transitions. When the input signal is less than said predetermined negative level, the polarity of the high-frequency component $Y_H$ is reversed and its amplitude is limited. Therefore, the excessive correction can be avoided.

The mode of operation of the combination of the DC shift circuit 22 and the nonlinear circuit 23 have been described in conjunction with the input-output characteristics shown in FIGS. 6A to 6E, but it is to be understood that the present invention is not limited thereto but includes any control system in which when the transient portions of the luminance signal and the color difference signal are opposite, the high-frequency component $Y_H$ of the luminance signal Y is reduced in amplitude or reversed in polarity.

The mode of operation of the first embodiment may be summarized as shown in FIG. 7 when the nonlinear transmission circuit 13 has the input-output characteristic as shown in FIG. 4A and the combination of the DC shift circuit 22 and the nonlinear circuit 23 in the step polarity detector 15 has the input-output characteristic curve as shown in FIG. 6A. The column (a) shows various waveforms as lettered when the color difference signal (C−Y) is positive; the column (b), those when the color difference signal is negative; and (c), those when the (C−Y) signal is positive but has a relatively less width, the luminance signal Y remaining unchanged throughout the columns. The present invention is best understood from the column (c) because of the difference in transition or rise and fall between the luminance signal Y and the color difference signal (C−Y). When the step polarity detector 15 and the modulator 16 are not provided as shown in FIG. 3, in response to the transitions of the luminance signal Y, the waveform of the color difference signal (C−Y) is corrected in the opposite direction, so that when the (C−Y) signal rises or falls, its amplitude is suppressed. However, according to the first embodiment of the present invention as shown in FIG. 2 (the step polarity detector 15 and the modulator 16 being included), in response to the output from the step polarity detector 15, the correction in the opposite or undesired direction can be suppressed or the correct correction can be attained.

In FIG. 7(A) is the color difference signal; (B), luminance signal; (C), the high-frequency component $Y_H$ of the luminance signal Y extracted by the high-frequency extraction circuit 14; (D), the color difference signal $(C-Y)_N$ from the nonlinear transmission circuit 13; (E), the signal obtained by the differentiation of the color difference signal (C−Y) by the first differentiation circuit 19; (F), the signal obtained by the differentiation of the luminance signal Y by the second differentiation circuit 20; (G), the product of the signals (E) and (F) indicating whether the transient portions of the luminance signal Y and the color difference signal (C−Y) are in the same direction or in the opposite directions; and (H), the output signal S from the nonlinear circuit 23 shown in FIG. 5 for controlling the modulator 16, thereby controlling the high-frequency component $Y_H$.

The modulator 16 is in general a multiplier which provides the product of the signals $Y_H$ and the signal (H) as the modulation output (I). The signal (I) is the high-frequency component of the luminance signal Y which in turn represents the steps of the waveform of the luminance signal. As described previously, the signal (I) is applied to the amplifier 17. (J) is the output from the amplifier 17 or the correction signal $(C-Y)_C$ which is zero when the color difference signal (C−Y) is negative (See the column (b)). (K) is the sum of the color difference signal (C−Y) and the correction signal $(C-Y)_C$; that is, the color difference signal which has been corrected.

From the waveforms shown in the row (K), it is seen that the color difference signal (C−Y) is corrected or so improved as to provide a higher degree of color definition only when it is positive as shown. When the color difference signal (C−Y) is positive and has a relatively small width as shown in the column (c), the step polarity detector 15 very effectively operates so that the color resolution is improved. If the step polarity detector 15 is not provided, the result would be a waveform similar to that shown in the column (a) so that the color definition would be degraded. When the color difference signal is negative, the output signal S from the step polarity detector 15 is applied to the modulator 16, but because of the output $(C-Y)_N$ from the nonlinear transmission circuit 13, the output or the correction signal $(C-Y)_C$ from the amplifier 17 becomes zero so that no correction is carried out.

The reasons why no correction is made when the color difference signal (C−Y) is negative will be described below. In general, luminance for color information is transmitted not only through the luminance channel but also through the color difference video signal channels. Especially in the case of colors with a higher degree of saturation, more luminance information is transmitted through the color difference video signal channels than through the luminance signal channel. In addition, a substantial part of the luminance information is transmitted through the color difference video signal channel or channels which are transmitting the positive color difference signals and degrades the definition of the picture reproduced. Therefore, it follows that when the correction signal $(C-Y)_N$ is added to the positive color difference signal (C−Y), the resolution can be improved because the correction signal itself produces the luminance information for color picture. However, even when the color difference signal (C−Y) is positive, the luminance signal Y goes negative as shown at FIG. 7(C), so that the color difference signal (C−Y) is corrected in some parts and is left uncorrected or adversely corrected in other parts.

According to the first embodiment of the present invention, the step polarity detector 15 is provided to overcome this defect so that the positive color difference signal can be corrected thoroughly and consequently the resolution can be improved or the portions with poor detail in the reproduced color picture can be decreased.

When it is desired to add the correction signal so that a signal with a predetermined value is uniformly added to the color portions, the nonlinear transmission circuit 13 and the amplifier 17 may be eliminated. Obviously, the series connection between the modulator 16 and the amplifier 17 may be reversed.

In summary, according to the first embodiment of the present invention, the color definition in the colored portions in the reproduced color picture can be considerably improved without resulting in any adverse effect.

Figure 9:
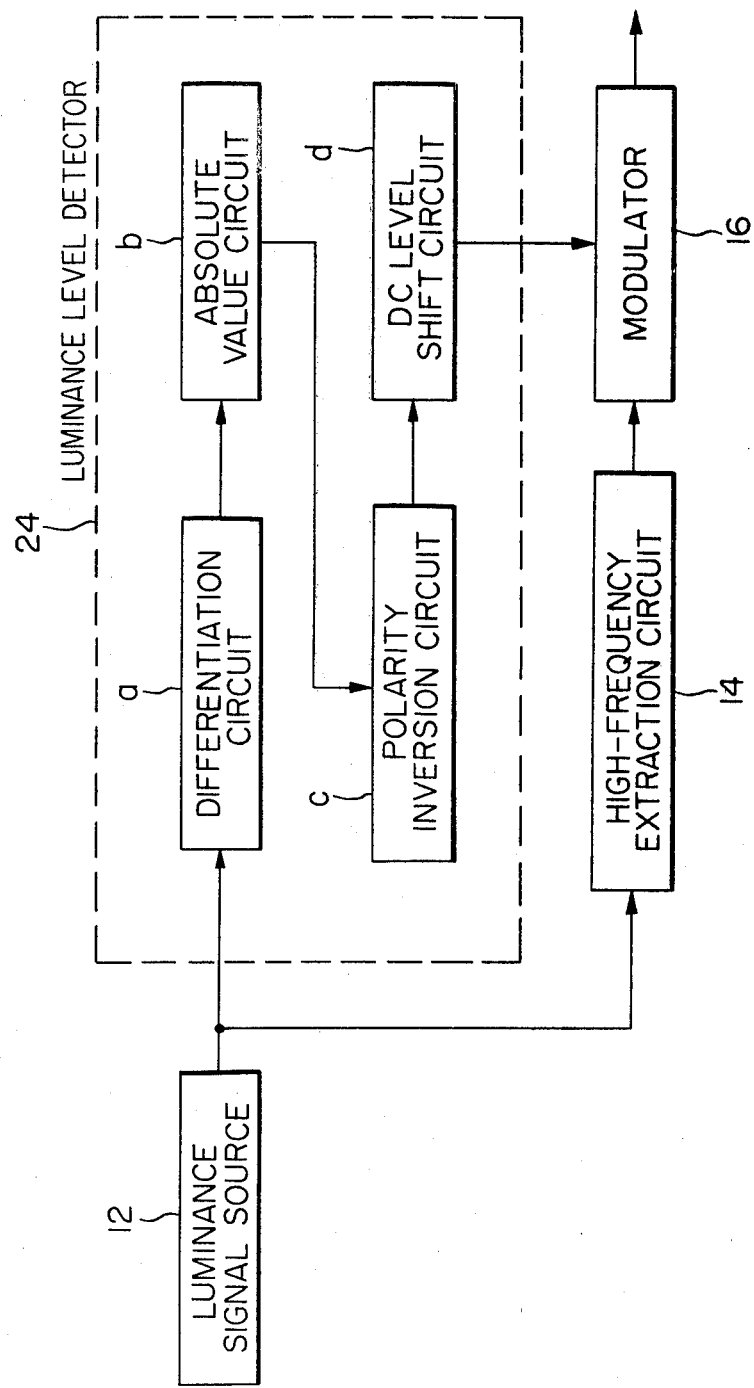
FIG. 9 is a block diagram of a luminance level detector shown in FIG. 8.
Figure 10:
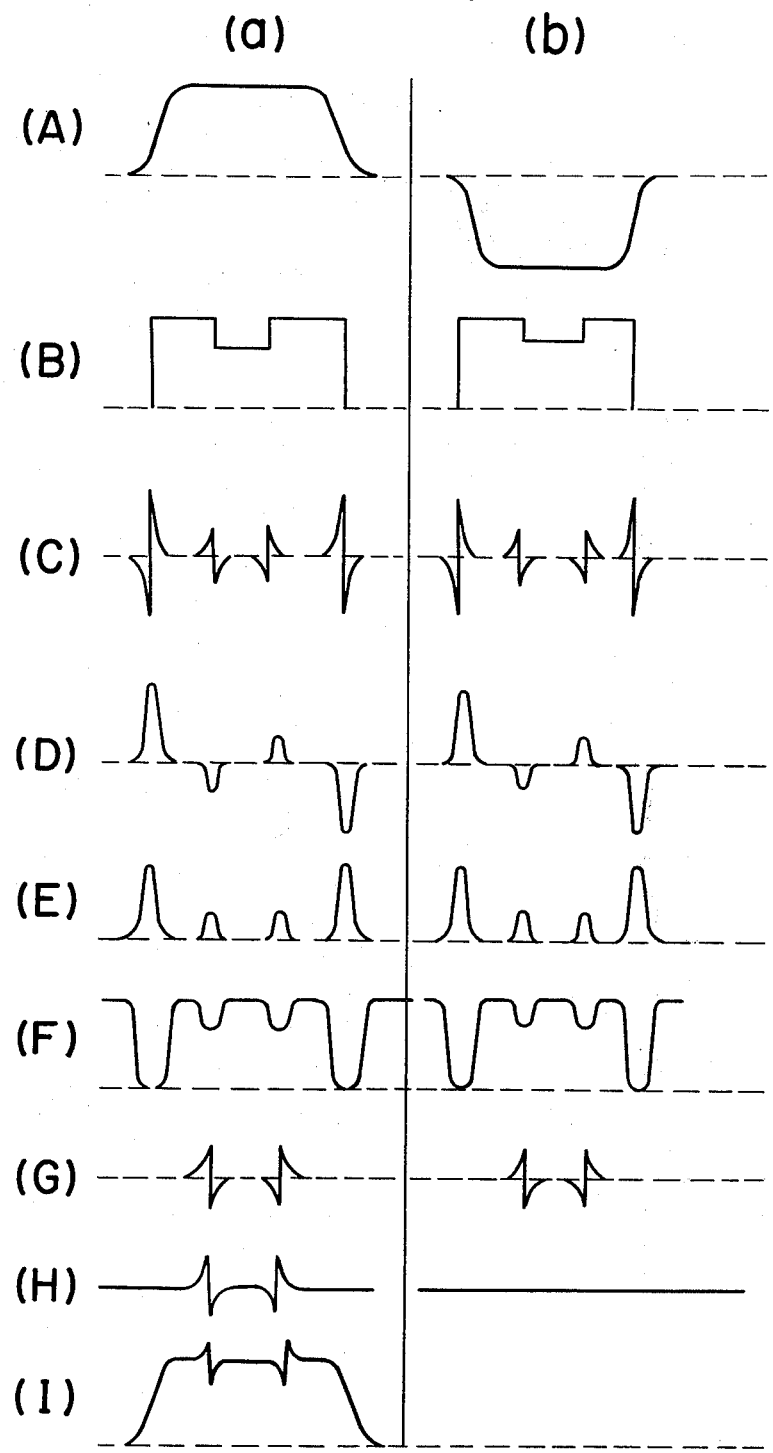
FIG. 10, including 10A-10I, shows various waveforms used for the explanation of the mode of operation of the second embodiment.

Second Embodiment, FIGS. 8 through 10

The second embodiment of the present invention shown in block diagram in FIG. 8 is substantially similar in construction to the first embodiment shown in FIG. 2 except that instead of the step polarity detector 15, a detector 24 for detecting the rate of change in luminance level or value is provided which responds only to the luminance signal Y.

The luminance-level-change-rate detector 24, which is the most important circuit element in the second embodiment, is shown in detail in FIG. 9. The luminance signal Y from the luminance signal source 12 is differentiated by a differentiation circuit a, which, as is the case of the first embodiment, may consist of a resistor and a capacitor or a difference circuit consisting of a time-delay element and a difference amplifier. An absolute value circuit b receives the output from the differentiation circuit a and provides its absolute value which in turn is applied to a polarity inverter c which inverts the polarity of the input signal. A DC level shift circuit d receives the output from the polarity inverter c and shifts is DC level.

FIG. 10 is a view similar to FIG. 7 but showing various waveforms generated in the second embodiment. At (A) is shown the waveforms of the color difference signal (C−Y); at (B), the luminance signal; at (C), the high-frequency component $Y_H$; at (D), the output from the differentiation circuit a; at (E), the output from the absolute value circuit b, the high peak representing a high rate of change in luminance signal level while the low peak representing a low rate of change; at (F), the output from the DC level shift circuit. The signal (E) is shifted to a predetermined DC level, so that the signal (E) is subtracted in such a way that the signal (F) becomes zero or almost zero when the rate of change in luminance level is high but shows a high value when the rate of change is low. The signal (F) is applied to the modulator 16. At (G) is shown the output from the modulator 16 which is the product of the signal (C) or the high-frequency component $Y_H$ and the signal (F). In general, the modulator 16 is a multiplier as in the case of the first embodiment. The signal (G) is the high-frequency component of the luminance signal Y the magnitude of which is in inverse proportion to the rate of change in luminance signal level.

Still referring to FIG. 10, the color difference signal in the column (a) is positive while the luminance signal Y is also positive, but in the column (b), the color difference signal (C−Y) is negative while the luminance signal is positive. In either case, the high-frequency signal of the luminance signal appears when the rate of change in luminance signal is low. The color difference signal from the nonlinear transmission circuit 13 controls the gain of the signal G as shown at (H). When the color difference signal is negative as shown in the column (b), the output from the nonlinear transmission circuit 13 is zero as described previously so that no correction signal appears at (H). (I) is the sum of the signal (A) and the signal (H); i.e., the corrected color difference signal which is added to the luminance signal (B) to reproduce the color picture as with the conventional color television receivers.

What is claimed is:

1. In a color television receiver, a system for improving image qualities comprising a high-frequency component extraction circuit connected to a luminance signal source and adapted to extract a high-frequency component of the luminance signal, a step polarity detection circuit connected to both said luminance signal source and a color difference video signal source and adapted to detect whether the transitions of the luminance signal and the color difference signal are in the same direction or in opposite directions and to provide a detection output which in turn is applied to a circuit having a nonlinear transmission characteristic, thereby generating a modulation signal, a modulator adapted to modulate said high-frequency component of said luminance signal with said modulation signal, thereby generating a correction signal, and an adder means adapted to provide the sum of said correction signal and the color difference signal and the luminance signal for the reproduction of a color picture.

2. A system as set forth in claim 1 wherein,
said circuit having a nonlinear transmission characteristic is included in said step polarity detection circuit, and includes an input signal limiting means, whereby the input over a predetermined level is suppressed.

3. A system as set forth in claim 1 wherein,
said circuit having a nonlinear transmission characteristic is included in said step polarity detection circuit and is adapted to suppress the transmission of the input signal less than a predetermined negative level.

4. A system as set forth in claim 1 wherein,
said step polarity detection circuit includes a DC shift circuit adapted to shift the DC level of the modulation signal, whereby even when the color difference signal has no transition, said modulator provides the high-frequency component of the luminance signal.

5. A system as set forth in claim 1, 2, 3 or 4 further comprising:
a nonlinear transmission circuit adapted to convert the color difference signal into the gain control signal in nonlinear relationship with said color difference signal, and
a variable gain amplifier adapted to control the gain of the high-frequency component of the luminance signal or the output signal from said modulator in response to said gain control signal.

6. A system as set forth in claim 5 wherein,
said nonlinear transmission circuit is adapted to transmit therethrough only the positive color difference signal.

7. A system as set forth in claim 5 wherein, said nonlinear transmission circuit is adapted to suppress the color difference signal more than a predetermined level.

8. In a color television receiver a system for improving picture qualities comprising:

a nonlinear transmission circuit adapted to receive the color difference signal from a color difference signal source and provide the gain control signal in nonlinear level relationship with said color difference signal, a high-frequency component extraction circuit adapted to receive the luminance signal from a luminance signal source and extract the high-frequency component thereof, a luminance level detector connected to said luminance signal source and adapted to detect the rate of change in level of the luminance signal so as to provide the modulation signal which can suppress the portion of the luminance signal at which the rate of change in level of the luminance signal is high, a modulator connected to the output terminal of said high-frequency extraction circuit and the output terminal of said luminance level detector and adapted to modulate the high-frequency component of the luminance signal in response to said modulation signal, a variable gain amplifier connected to the output terminal of said nonlinear transmission circuit and the output of said modulator and adapted to control the gain of the high-frequency component of the luminance signal which has been modulated with said gain control signal, thereby providing the correction signal, and an adder means connected to said variable gain amplifier, said color difference signal source and said luminance signal source and adapted to provide the sum of said correction signal, the color difference signal and the luminance signal for the reproduction of the color picture.

* * * * *